United States Patent
Pehrsson et al.

[15] 3,647,318
[45] Mar. 7, 1972

[54] HOLLOW BLADE FOR PROPELLERS AND METHOD OF MAKING IT

[72] Inventors: Anders Lennart Pehrsson; Sven-Ola Andersson, both of Kristinehman, Sweden

[73] Assignee: Aktiebolaget Karlstads Mekaniska Werkstad, Karlstad, Sweden

[22] Filed: July 9, 1969

[21] Appl. No.: 840,378

[30] Foreign Application Priority Data

July 11, 1968 Sweden..................................9539/68

[52] U.S. Cl............................................416/233, 416/213
[51] Int. Cl..........................................................B63h 1/26
[58] Field of Search..................................416/232, 233, 213

[56] References Cited

UNITED STATES PATENTS 2,015,332    9/1935    Baumann..........................416/233 X
3,359,936   12/1967    Kock..................................416/233 X

FOREIGN PATENTS OR APPLICATIONS 669,745    4/1952    Great Britain.........................416/233

Primary Examiner—Everette A. Powell, Jr.
Attorney—Brumbaugh, Graves, Donohue & Raymond

[57] ABSTRACT

The body of a hollow propeller blade is fabricated in sections disposed generally transversely across the blade by progressively building up the body beginning from the root section and working toward the tip by welding a wall section on the pressure side of the blade to the preceding wall section and grinding both sides of such weldment to enable a very thorough inspection of the weld to be made before installing the corresponding wall on the suction side of the blade. Each succeeding section moving away from the root may be of progressively thinner plate material, and the wall plate of each section may be constituted by separate parts with the outer parts being of thinner plate material than the center part. Longitudinal stringers and transverse ribs extend across the body cavity in spaced-apart relation.

2 Claims, 4 Drawing Figures

PATENTED MAR 7 1972 3,647,318

HOLLOW BLADE FOR PROPELLERS AND METHOD OF MAKING IT

BACKGROUND OF THE INVENTION

This invention relates to hollow blades for propellers, principally for marine propellers, and to a method of manufacturing the hollow blades.

Hollow blades for watercraft and aircraft propellers and for the runners of water turbines and pumps have been manufactured for some time and offer the advantages of more than adequate strength without the substantial weight penalty involved with a solid construction and, in some instances, of lower cost. In the case of marine propellers, particularly, a hollow blade has previously been manufactured by constructing the hollow body from two plates of uniform thickness appropriately shaped to provide the desired profile of the respective surfaces of the blade. The two body plates are joined to each other along their edges, usually with an end member, to form the rim of the blade and are welded to a root section and tip section. With this structure, the uniform thickness of the walls is actually unnecessary, inasmuch as the stresses imposed on the blade in operation are less at points more remote from the root. Consequently, it has also been proposed to construct the blade body from plates of somewhat lesser thickness than that required to develop the maximum strength required at the most highly stressed parts of the blade and to add stiffening plates or ribs in the more highly stressed portions of the plate before welding the plates together.

One disadvantage of the two-part technique used heretofore is the difficulty of forming the plates constituting the walls of the blade body with sufficient accuracy to obtain the proper shape or profile of the blade in cross section. The problem of proper formation of the geometry of the plates is greatly increased as the size of the blade involved increases. Consequently, this technique of manufacturing hollow propeller blades has been primarily restricted to propellers of relatively small size and has not been used to manufacture large propellers.

SUMMARY OF THE INVENTION

There is provided, in accordance with the invention, novel and improved hollow propeller blades and a method of manufacturing such blades that overcome the disadvantages of known blades and methods and enable the manufacture of large-sized propellers. The structure of the blade is such that is is able to withstand very high loads and stresses, and the technique of manufacturing it does not require the shaping of large-sized plates into complex, compound curvatures to produce the desired cross section profile of the blade.

More particularly, a hollow propeller blade, according to the invention, is made up of a multiplicity of sections, each of which constitutes a generally transversely extending segment of the blade body, two or more of such sections being disposed in edge-to-edge relation to form a composite, hollow blade body portion. Each section of the blade consists of wall members, which may be either a single plate extending all the way across the propeller or a multiplicity of plates welded together end-to-end to form a composite member, two such plates being spaced apart and the respective two plates constituting portions of the two wall surfaces of the propellers. A blade root section and a blade tip section are joined to opposite ends of the hollow body. Preferably, the body is reinforced by several spaced-apart stringers extending generally longitudinally of the blade within the body cavity and formed by plates or other suitable structural shapes that extend transversely between the wall members of the several sections. Further, the blade may include transverse ribs that also extend between the walls. The stringers and ribs are, of course, joined to the wall members of the several sections and, preferably, to each other.

Advantageously, the wall members making up each successing section moving away from the root of the blade are made of thinner material, the thickest wall plates of the body section being those nearest the root and the thickness progressively decreasing moving outwardly. In a similar manner, it is often advantageous to form each wall member from a multiplicity of plate sections with the outermost sections being thinner than the innermost section or sections, relative to generally the center of the blade. The gradation of plate thickness offers the advantages of reducing the weight, facilitating the shaping of the plates, especially the thinner ones, to very accurate profile, and providing a blade having the requisite strength for stresses at various points without the weight and cost penalties of excessive strength where it is not needed. The structural characteristics of the blades are further enhanced by installing the transverse ribs in the hollow of the blade in a portion of each section that is remotest from the root of the blade. In such location, the weakening of the blade resulting from formation of weldments between the ribs and the walls is of less importance than it would be if the ribs were located nearer to the root.

The method of manufacturing the blades, according to the invention, involves paying particular attention to the weldments that are formed on the pressure side of the blade, inasmuch as the pressure side of the blade is subjected to tensile stresses in normal forward operation of the vessel. The assembly procedure thus becomes important. According to the invention, the blade is built up by beginning at the root and progressively constructing each section moving outwardly from the root. Each section is added to the blade by first welding the plate on the pressure side to the preceding section and then grinding and carefully inspecting each pressure side weldment from both sides before installing the suction side plate of the section.

DESCRIPTION OF THE DRAWINGS

For a better understanding of the invention, reference may be made to the following description of exemplary embodiments, taken in conjunction with the figures of the accompanying drawings, in which.

DESCRIPTION OF EXEMPLARY EMBODIMENTS

Figure 1:
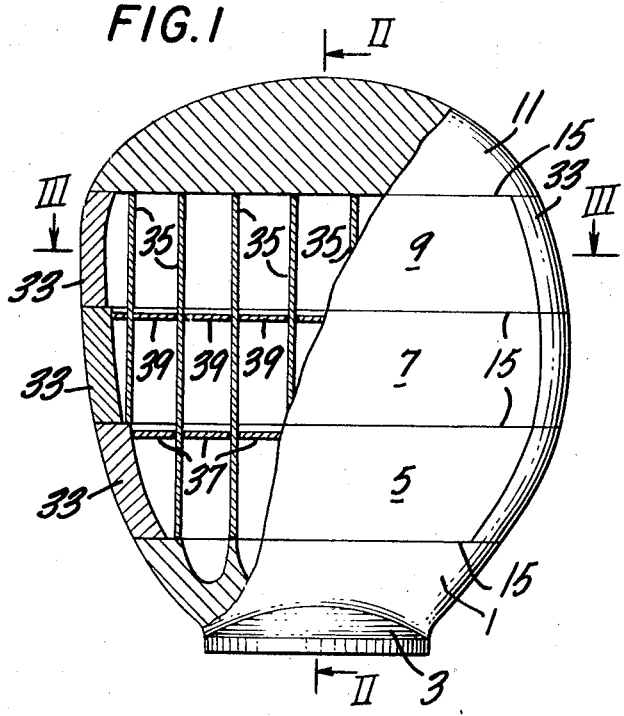
FIG. 1 is a front elevational view, but with a portion of the front wall broken away, of one embodiment of the invention.
Figure 2:
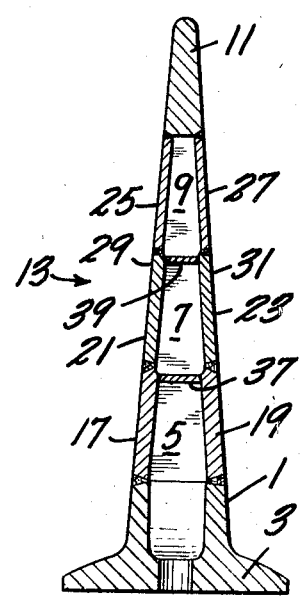
FIG. 2 is a side view in section of the embodiment of FIG. 1 taken generally along a plane represented by the lines 2—2 and in the direction of the arrows.
Figure 3:
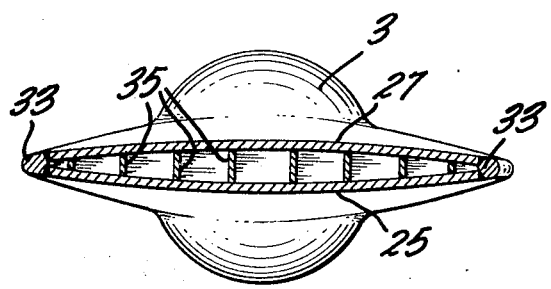
FIG. 3 is an end view in section of the embodiment of FIG. 1 taken generally along a plane represented by the lines 3—3 and in the direction of the arrows.

Referring first to FIGS. 1 to 3, one embodiment of a hollow propeller blade, according to the invention, comprises a blade root section 1, which is usually a cast steel member and which has a base flange 3 for securing it to a hub (not shown). A main hollow body portion 13 of the blade is made up of a multiplicity of hollow sections, the drawings showing, for purposes of illustration, three such sections, 5, 7 and 9. A blade tip 11, which may, like the root section, be made of cast steel, is secured to the outer end of the body portion 13. In the illustrated version, the three sections are of generally the same width, i.e., the dimension in the longitudinal direction of the blade, and the side, transversely extending edges of the sections are delimited by substantially parallel planes, as may be seen by reference to the dividing lines between the three sections that are designated by the reference numeral 15 in FIG. 1. However, the geometry of the sections may differ from the embodiment shown. For example, while the planes of the transversely extending edges of the embodiment are parallel to the axis of rotation of the propeller, they may form an acute angle with the axis of rotation. Also, the three sections may be delimited by cylindrical surfaces concentric with the axis of rotation of the propeller, or by conical surfaces of the same or different angles, the axes of such conical surfaces coinciding with the axis of rotation of the propeller.

Each of the three sections, 5, 7 and 9, is composed of two spaced-apart wall members (reference numerals 17, 19, 21, 23, 25 and 27 in the drawing) that have been formed from plate stock by any suitable method of plastic deformation to a shape that provides the desired contours for the respective pressure and suction surfaces of the blade. Associated with the plates of each hollow section of the blade body are edge pieces 33, each of the edge pieces 33, of course, being shaped to provide the desired profile outline of the blade in elevation as well as to provide the desired shape of the blade edge in cross section. As will be described in more detail below, the side plates and end pieces of the body are welded together to form, in the finished blade, a composite hollow body unit.

Located within the hollow body portion are a multiplicity of spaced-apart stringers 35 which are substantially parallel to the longitudinal axis of the blade and extend transversely between the walls of the several sections. In addition, spaced-apart webs or ribs 37 and 39 extend transversely across the blade body and between the walls of the body. The ends of the stringers 35 are welded to the root section and tip section of the blade, and the longitudinal edges of the stringers are welded to the blade walls, and the ends of the transverse ribs 37 and 39 are welded to the stringers and to the body plates. Preferably, the ribs 37 and 39 of the respective sections 5 and 7 are located adjacent the edges 15 of those sections that are the more remote from the root section 1, inasmuch as such a location places them at the region of at least stress of the section.

Advantageously, as illustrated by the embodiment, the plates of the respective sections 5, 7 and 9 are of decreasing thickness moving away from the root section 1. The stresses on the blade decrease moving out from the root section, and therefore the wall thickness of the hollow blade body may correspondingly decrease inasmuch as less strength is required in the blade body, the more remote from the root a particular location on the blade body is.

Figure 4:
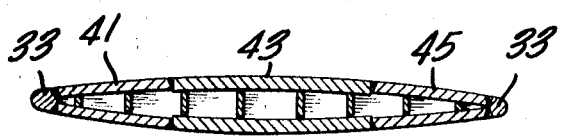
FIG. 4 is an end sectional view of a modified embodiment of the invention.

FIG. 4 illustrates a modification of the embodiment of FIGS. 1 to 3. Basically, the embodiment of FIG. 4 is the same as that of FIGS. 1 to 3 except that rather than employing one-piece plates for the two walls of each of the sections 5, 7 and 9 that extend the whole way across the blade, each of the walls of each section is made up of three parts, a center part 43 and two end parts 41 and 45. The center part 43 of each wall is fabricated from thicker plate stock than the outer parts 41 and 45. Thus, the strengths of the plates are generally correlated to the stresses exerted on them, the stresses on the center region of the blade in the area of the center part 43 of the plates being greater than the stresses acting on regions more remote from the center of the blade. This feature of FIG. 4 can, of course, be combined with the decreasing thickness of the wall plates of succeeding sections moving outwardly from the blade root.

The two embodiments are merely exemplary of the general scheme of the blade construction in respect of the utilization of a multiplicity of body sections. For example, a blade may be made up of only two sections, or there may be more than the three sections illustrated in FIGS. 1 to 3. Similarly, the number of parts placed together to make up a wall of a section may be greater than the three depicted in FIG. 4. As has already been mentioned, furthermore, the precise geometric form of the plates and sections may be based on other than a generally rectangular elevation in which the planes delimiting the sections are parallel.

Turning now to the method of manufacturing the hollow blade, according to the invention, the sequence of steps in fabricating the blade from the constituent elements is of some importance. In particular, the blade is constructed by building up succeeding sections beginning with the section 5 adjacent the root and moving outwardly toward the tip. Moreover, the sequence of assembling and welding together each section onto the previously constructed portion of the blade is of some importance. In the latter regard, each section is built up by first installing and welding the plate on the pressure side (reference numeral 29) of the blade of such section onto the previous section (or onto the root section 1 in the case of the first section 5). After the pressure side plate is welded onto the adjacent plate, both sides of the weldment are ground and are carefully inspected to ensure that there are no cracks that might fail under tensile loads to which the pressure side of the blade is subjected in normal operation of the blade. After the pressure side plate of each section has been welded onto the preceding section and the end members 33 associated with that plate have been welded onto it, the stringers may be welded onto the plate, and the plate on the suction side (reference numeral 31) is then welded onto the stringers and onto the suction side plate of the previously built section. As the final step of completing a section, the ribs (37 or 39) are welded in place.

With reference to the embodiments of FIGS. 1 to 3, an exemplary procedure, according to the method of the invention, is as follows: The inner ends of the stringers 35 are welded onto the root section 1. The first plate on the pressure side 29 of the blade (i.e., the plate 17 on the pressure side of the section 5) is welded onto the root section 15. The end members 33 associated with the section 5 are welded onto the ends of the plates 17, and all of the weldments on the pressure side are ground on both sides and carefully inspected to make sure that there are no cracks. Any remedial welding work is then performed to ensure that the structure thus far is sound. Either before or after completing and grinding the weldments between the plate 17 and the root section 1 and end members 33, the stringers are welded to the plate 17. Then, the first section 5 is completed by welding the suction side plate 19 of the section 5 to the root section 1, end members 33 of that section and the stringers and finally by positioning and welding in the ribs 37, the ribs 37 being welded to both of the plates 17 and 19 and to the stringers. This completes and closes off the first section.

The assembly of the second section 7 is commenced by first welding the pressure side plate 21 onto the pressure side plate 17 of the next inward section 5 and by welding on the end members 33 and welding the end members 33 associated with the sections 5 and 7 to each other. The weldments on the pressure side are then ground on both sides to facilitate inspection for fractures as well as to finish the external surface of the blade. Either before or after the preceding step, the stringers 35 are welded to the plate 21 and, as before, the suction side plate 23 is welded to the plate 19, the end members 33 and the stringers, followed by installation and welding of the ribs 39. This completes the second section 7.

The third section is installed by first welding the plate 25 on the pressure side of the section 9 to the plate 21 and welding on the end members 33. In addition, the tip section 11 is welded onto the plate 25 at this point. All of the pressure side weldments are then ground and inspected, as before. Then, the stringers 35 are welded to the tip 11 and to the plate 25. Finally, the suction side plate 27 of the section 9 is installed and welded to the plate 23, the end members 33 and to the tip 11. Inasmuch as the cavity of the blade is now closed off, there is no opportunity to weld the stringers to the plate 27. However, the plate 27 is on the suction side and is not subjected to severe stresses. Moreover, the plate 27 is located relatively remote from the root of the blade where the stresses are relatively low in any event. This completes the assembly of the blade.

We claim:

1. A hollow blade for a propeller comprising a root section, a tip section and a body portion located between and joined to the root and tip sections, the body portion being composed of at least three hollow body sections, each of which extends generally crosswise of the blade and is composed of a pressure-side wall member and a suction-side wall member spaced apart to define a cavity between them, a leading edge piece and a trailing edge piece, the ends of both wall members of each body section being welded to the edge pieces thereof, each wall member of each body section being composed of at least three plates joined in end-to-end relation, and the plates of each wall member adjacent the blade edge being thinner than the intermediate plate, weldments joining mating transverse edges of the adjacent sections of the blade to each other, a multiplicity of spaced-apart stringers extending generally longitudinally of the blade and transversing the hollow body sections and disposed substantially transverse to the major plane of the blade and welded to the root and tip sections at their ends and welded to at least the pressure-side wall members of the body sections, and a rib extending across the space between the wall members of each body section, except for the body section that is adjacent the tip, the rib of each body section being generally aligned with and in closely adjacent relation to the side edges of the wall members of each said section that are the more remote from the blade root section and being welded to the stringers and to both wall members and to the edge pieces.

2. A blade according to claim 1 wherein the wall members of the body sections are of decreasing thickness in each succeeding body section moving away from the root section toward the tip.

* * * * *